(12) United States Patent
Schlesinger et al.

(10) Patent No.: US 8,981,995 B2
(45) Date of Patent: Mar. 17, 2015

(54) LOW ACCURACY POSITIONAL DATA BY DETECTING IMPROBABLE SAMPLES

(75) Inventors: Benny Schlesinger, Ramat Hasharon (IL); Vadim Kuper, Yokneam Illit (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 836 days.

(21) Appl. No.: 13/152,299

(22) Filed: Jun. 3, 2011

(65) Prior Publication Data

US 2012/0306699 A1 Dec. 6, 2012

(51) Int. Cl.
G01S 3/02 (2006.01)
G01S 19/42 (2010.01)
H04W 64/00 (2009.01)

(52) U.S. Cl.
CPC .............. *H04W 64/00* (2013.01); *G01S 19/42* (2013.01)
USPC .......................................... 342/451; 342/463

(58) Field of Classification Search
CPC ........... G01S 5/02; G01S 5/0252; G01S 5/14; G01S 5/06
USPC ............... 342/451, 457, 463, 465; 455/456.1, 455/456.6
See application file for complete search history.

(56) References Cited

U.S. PATENT DOCUMENTS

| | | | |
|---|---|---|---|
| 5,394,333 A | 2/1995 | Kao | |
| 5,629,855 A | 5/1997 | Kyrtsos et al. | |
| 6,556,832 B1 | 4/2003 | Soliman | |
| 6,810,325 B2 | 10/2004 | Amano et al. | |
| 7,299,059 B2 | 11/2007 | Misikangas et al. | |
| 7,349,683 B2 | 3/2008 | Misikangas et al. | |
| 7,840,340 B2 | 11/2010 | Graham et al. | |
| 2004/0266457 A1 | 12/2004 | Dupray | |
| 2006/0052115 A1 | 3/2006 | Khushu | |
| 2007/0042790 A1 | 2/2007 | Mohi et al. | |
| 2007/0225937 A1 | 9/2007 | Spiesberger | |
| 2007/0287473 A1 | 12/2007 | Dupray | |
| 2008/0262728 A1 | 10/2008 | Lokshin et al. | |
| 2008/0268870 A1 | 10/2008 | Houri | |
| 2009/0005975 A1 | 1/2009 | Forstall et al. | |
| 2010/0106603 A1 | 4/2010 | Dey et al. | |
| 2010/0174479 A1 | 7/2010 | Golding et al. | |
| 2010/0250727 A1 | 9/2010 | King et al. | |
| 2011/0319094 A1 | 12/2011 | Usui et al. | |

FOREIGN PATENT DOCUMENTS

EP 2293016 A2 3/2011

OTHER PUBLICATIONS

"International Search Report", Mail Date: Jan. 21, 2013, Application No. PCT/US2012/040140, Filed date: May 31, 2012, pp. 18.
Huang, et al., "Improve GPS Positioning Accuracy with Context Awareness", Published Date: Jul. 31, 2008-Aug. 1, 2008, pp. 94-99.

(Continued)

*Primary Examiner* — Dao Phan
(74) *Attorney, Agent, or Firm* — Steven Spellman; Jim Ross; Micky Minhas (57) ABSTRACT

An embodiment of the invention provides a method of determining a location of a mobile target that processes locations for the target provided by a wireless location technology tracker system to determine if the locations are outliers, discards locations that are determined to be outliers, and uses locations determined not to be outliers as locations for the target.

20 Claims, 4 Drawing Sheets

(56) References Cited

OTHER PUBLICATIONS

Lin, et al., "Fuzzy processing on GPS data to improve the position accuracy", Published Date: Dec. 11-14, 1996; IEEE, pp. 557-562.

"International Search Report & Written Opinion for PCT Patent Application No. PCT/US2013/050963", Mailed Date: Nov. 8, 2013, Filed Date: Jul. 17, 2013, 14 Pages.

Office Action dated Jun. 6, 2013 from U.S. Appl. No. 13117171 filed May 27, 2011.

Office Action dated Dec. 6, 2013 from U.S. Appl. No. 13117171 filed May 27, 2011.

LOW ACCURACY POSITIONAL DATA BY DETECTING IMPROBABLE SAMPLES

TECHNICAL FIELD

Embodiments of the invention relate to methods of determining the geographic location of a person or object.

BACKGROUND

Various systems, hereinafter referred to as "tracker systems", and methods, hereinafter "wireless location technologies" (WILOTs), for wireless determination of a location of a mobile transmitter and/or receiver terminal and a person or object, a "bearer", carrying or mounted with the mobile terminal, are known. Common transmitter and/or receiver terminals that incorporate and/or are located by WILOT tracker systems are mobile phones, global positioning satellite (GPS) receivers, computers, personal data assistants (PDAs), and workbooks. Among common wireless location technologies employed by tracker systems to determine a location of a mobile transmitter and/or receiver and thereby its bearer, are technologies referred to as trilateration and multilateration. Hereinafter, a transmitter and/or receiver, and/or a device in which it is housed, and/or its bearer, that are located by a tracker system are distinguished as being a "target", used as a modifier or noun, of the tracker system.

In some WILOT tracker systems using trilateration location technologies and apparatus, signals from three or four transmitters having known locations are received by a target receiver and used to determine a transit time from each transmitter to the target receiver. Each transit time defines a spherical surface having its center at the transmitter for which the transit time was determined and a radius equal to the speed of light times the transit time. Were all the transit times and locations of the transmitters known with absolute accuracy, the spherical surfaces would have a well defined common intersection point, at which the target receiver would be located.

In practice of course, the transit times and transmitter locations are not known with absolute accuracy, and the spherical surfaces in general do not intersect at a well defined common point. The target receiver (and thereby its bearer), is therefore generally determined to be located in a region of uncertainty (ROU) in which all the spheres come closest to intersecting. A size of the ROU and therefore accuracy of location is dependent on, among other factors, accuracy of synchronization of clocks in the transmitters and receiver that are used to determine transit times between the transmitters and the receiver.

Size of an ROU associated with a location of a target is assumed to be determined by a characteristic linear dimension, such as a radius or diameter, of an area of uncertainty associated with the location. An ROU having a characteristic dimension "X", in given units of length may be recited as an "ROU of X" in the given units. An ROU, unless otherwise specified is assumed to have a centroid coincident with a target location with which it is associated. For a circular ROU the center of the ROU circle is coincident with the target location. An ROU, unless otherwise specified, is considered to have a spatial location defined by a target location with which it is associated and reference to the ROU is considered to include a reference to its associated target location.

In tracker systems that use the GPS system, GPS receivers, such as are commonly available for locating vehicles and persons, are located by trilateration using clock signals transmitted from at least three GPS satellites. GPS satellite clock signals are generally accurate to ±200 ns (nanoseconds) relative to Universal Time Coordinated (UTC) and some GPS systems can locate a receiver in an ROU having a characteristic dimension of a few tens of centimeters.

A trilateration technology may of course be used in "reverse", with a single transmitter transmitting signals to three or four receivers to provide signal transit times useable to determine a location of the transmitter.

In WILOT tracker systems using multilateration location technologies and apparatus, time differences of arrival, or differences in signal strength, of signals from three or more synchronized transmitters received at a receiver are used to determine location of the receiver. Mobile phone networks may use multilateration location systems in which synchronized base station transmitters from different cells in the network transmit signals to mobile terminals, such as mobile phones, personal digital assistants (PDA), and laptop computers, to provide locations for the mobile terminals.

Accuracy of positioning provided by a mobile phone network multilateration technology is generally less than accuracy of location provided by GPS based trilateration technologies. Accuracy may be influenced by size of the cells in the mobile phone network, which may have characteristic dimension that range from about 100 m (meters) to about 3 km (kilometers). Usually, a mobile phone network provides locations having ROUs of dimensions between about 1,000 m (meters) and about 2,000 m.

As in trilateration location technologies, multilateration location technologies may be operated in "reverse", with differences between times of arrival or signal strengths of signals from a single transmitter received at three or four receivers being used to determine location of the single transmitter.

Many mobile terminals are now equipped with inertial navigators. An inertial navigator typically comprises a set of accelerometers and gyroscopes and integrates measurements of acceleration provided by the accelerometers and gyroscopes to "dead reckon" a path traveled by the navigator from a starting location. A terminal point of the integrated path provides a location of the navigator and the navigator's bearer relative to the starting location. Whereas an inertial navigator operates differently than the examples of WILOT systems discussed above, an inertial navigator is considered a WILOT tracker and is distinguished from other WILOT trackers when its differences from other WILOT trackers are pertinent to the discussion.

Errors in a location provided by an inertial navigator propagate and tend to increase as time over which a path is integrated and length of the integrated path increases. Inexpensive accelerometers and gyroscopes comprised in a consumer inertial navigator suffer from drift that degrades accuracy of location provided by the navigator relatively rapidly with integration time and/or path length of a path the navigator integrates. As a result, ROUs for locations determined by commercial inertial navigators may have characteristic dimensions that grow to hundreds of meters over a dead reckoning integration period of about a half hour.

Whereas GPS based tracker systems generally provide the most accurate determinations of locations, they require relatively large amounts of power, and generally do not function at locations for which line of sight to at least three GPS satellites is not available. Various multilateral and trilateral tracker systems are subject to disturbance by multipath signaling, in which energy from a same signal travels by more than one path to a target receiver, arrives at the receiver at different times, and degrades measurements of signal transit times and/or signal strengths. Accuracy of both trilateral and multilateral tracker systems is compromised by loss or degradation of synchronization between clocks in the systems. As a result, the various WILOT tracker systems often become erratic and provide locations for a target that are unreliable.

SUMMARY

An embodiment of the invention relates to providing a tracker system, hereinafter referred to as a "Discriminating Tracker", that provides locations for a target responsive to locations provided by a WILOT tracker that are corrected for locations which are aberrant when considered relative to other locations provided for the target. Aberrant WILOT locations are hereinafter also referred to as "outlier locations" or "outliers". Optionally, if a location provided by the WILOT tracker is determined to be an outlier location, the Discriminating Tracker does not use the WILOT location and/or an ROU associated with the WILOT location to determine a location and/or an associated ROU for the target. In an embodiment of the invention, if a WILOT location for the target is classified as an outlier, the Discriminating Tracker operates to acquire at least one additional location for the target from another WILOT tracker for a time close to a time for which the outlier location is acquired. If the at least one location provided by the other WILOT tracker and the outlier location are consistent, the outlier location is considered to be corroborated as a valid location that may be used for locating the target.

In an embodiment of the invention, a Discriminating Tracker comprises a processor that receives data from a WILOT tracker defining a set, also referred to as a "sample set", of at least one location, at which a target was present at different times during a given period of time. The processor processes the data to determine an expected location and a variance of the expected location for a location of the target provided by the WILOT tracker and/or for a parameter associated with a location provided by the WILOT tracker. An associated parameter may, by way of example, be acceleration, velocity, or direction associated with motion of the target.

The processor uses the expected value and variance to determine if a location provided by the WILOT tracker is to be considered an outlier location. Optionally, the processor uses the expected location and variance to define an expected region of uncertainty (EROU) for the location provided by the WILOT tracker. Optionally, the EROU has a centroid located at the expected location associated with the EROU. In an embodiment of the invention, if the target location provided by the WILOT tracker lies outside the EROU, the WILOT location is classified as an outlier. Optionally, the WILOT location is a location, hereinafter a "future location", for the target at a time later than a latest time for which a location in the sample set of locations is provided.

It is noted that an EROU for a target location in accordance with an embodiment of the invention is not necessarily circular, and may for example be elliptical or have an irregular shape. A circular EROU implies that probability of displacement of a target location from an expected target location associated with the EROU is independent of direction of the displacement. An elliptical EROU indicates that displacement of a target location from an expected location of the target may be less probable along one direction of two orthogonal directions than along the other of the two orthogonal directions. An irregular EROU may be indicated for a spatially asymmetric dependence of displacement of a target location from an expected target location associated with the EROU.

In an embodiment of the invention, a sample set of locations is used to determine a habitual motion pattern for a target that is associated with a given set of circumstances. For example, a habitual motion pattern may be established by a Discriminating Tracker responsive to a plurality of locations along a same route that a person drives back and forth to work every day in a car tracked by a WILOT tracker. The habitual motion pattern may also comprise an end location that is a same parking spot at work in which the person parks his or her car every day. Deviation from traveling the habitual route to work or parking the car in the habitual parking spot may result in a location provided by the WILOT tracker being classified as an outlier location.

In the discussion unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1A:
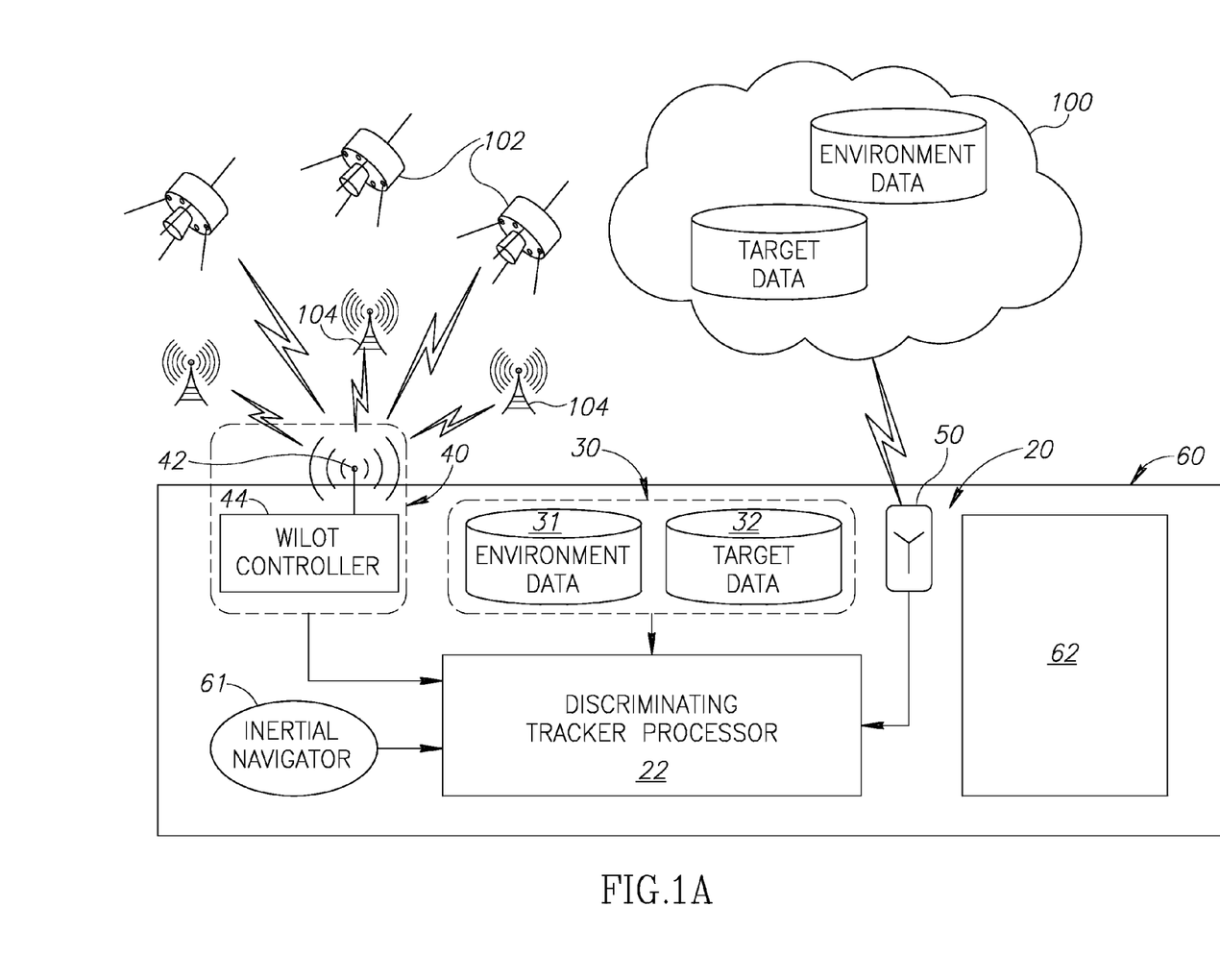
FIG. 1A schematically shows components of a Discriminating Tracker, in accordance with an embodiment of the invention.
Figure 1B:
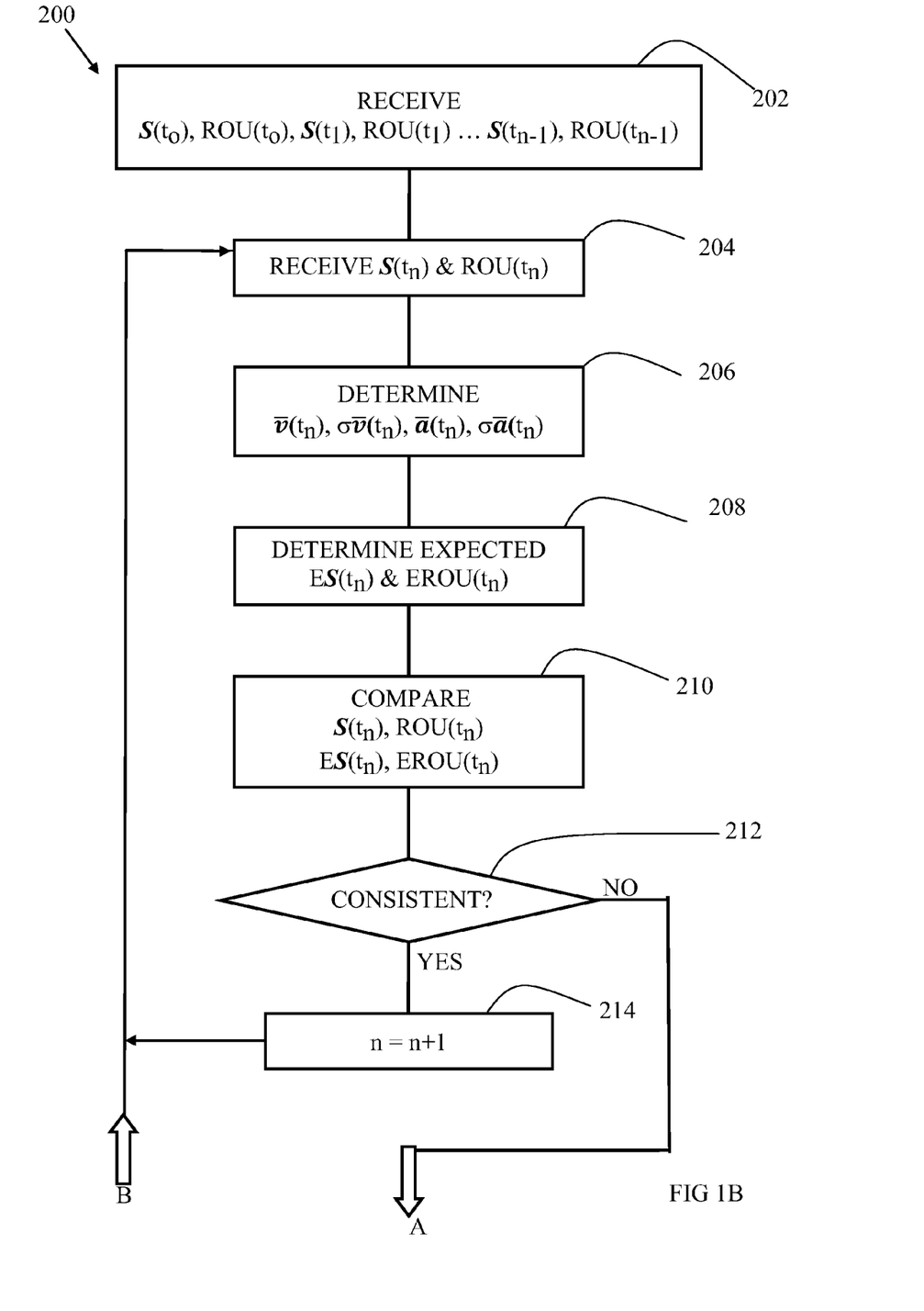
FIGS. 1B and 1C show a flow diagram of an algorithm that a Discriminating Tracker uses to determine if a location provided for the target by a WILOT tracker is an outlier location, in accordance with an embodiment of the invention.
Figure 1C:
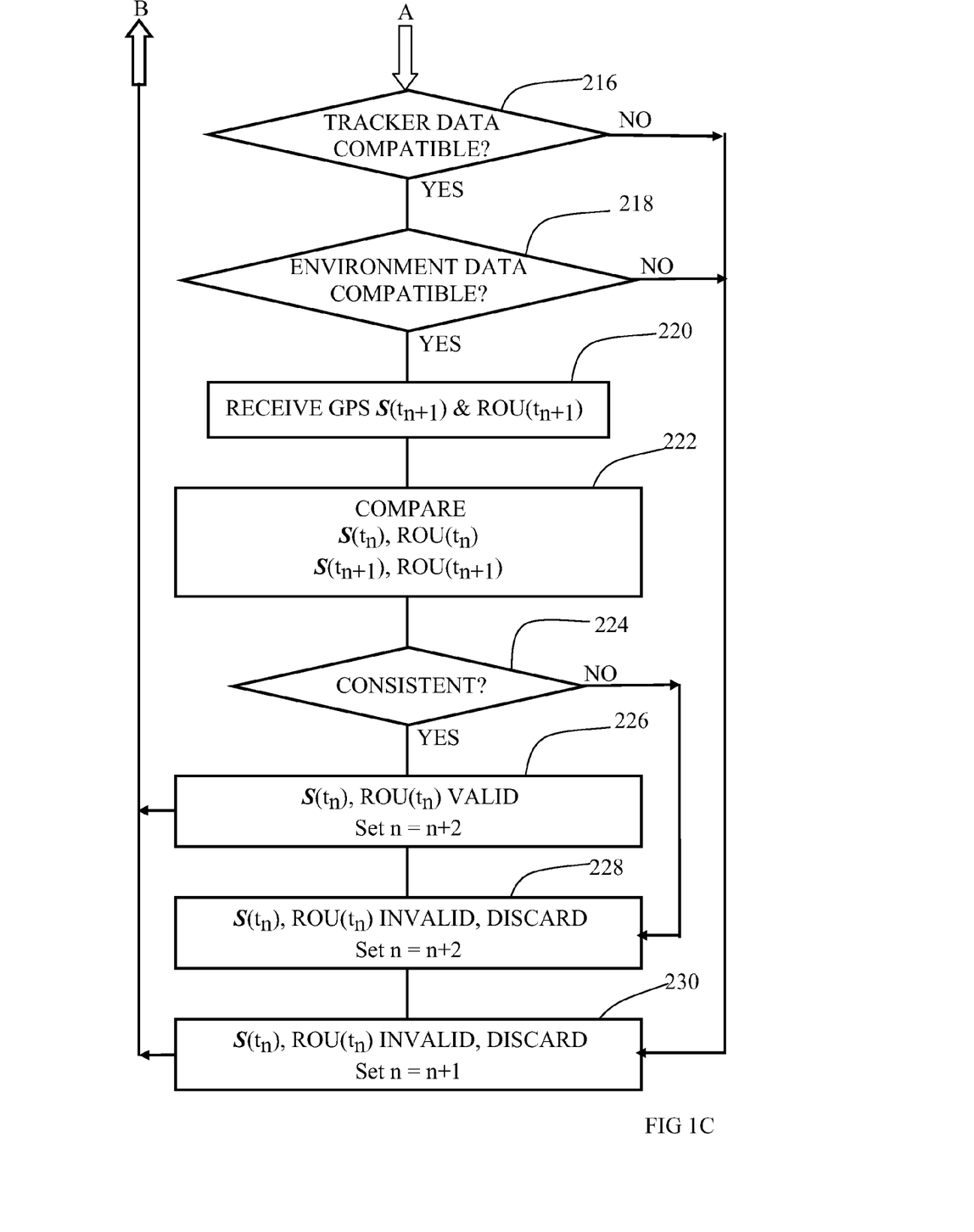

In the following detailed description, a Discriminating Tracker, in accordance with an embodiment of the invention, that provides locations for a target that processes data defining locations for the target provided by a WILOT tracker to determine whether to classify the locations as outlier locations is discussed with reference to FIGS. 1A and 1B. FIG. 1A schematically shows components of the Discriminating Tracker, and FIG. 1B presents a flow diagram of an algorithm that the Discriminating Tracker may use to determine whether a location for a target provided by the WILOT tracker is to be classified as an outlier location.

Operation of a Discriminating Tracker in detecting and processing outlier locations generated by a WILOT tracker tracking motion of a tractor-trailer making a cargo delivery is described and discussed with reference to FIG. 2.

FIG. 1A schematically shows a Discriminating Tracker 20, for providing locations for a target that, optionally, comprises a processor 22, at least one memory device 30, and a mobile WILOT target terminal 40. Optionally, Discriminating Tracker 20 comprises a wireless network interface 50 that enables the system wireless access to the internet 100. In an embodiment of the invention, as schematically shown in FIG. 1A, Discriminating Tracker processor 22, memory device 30, internet interface 50, and WILOT target terminal 40 are housed in a same mobile device 60. Optionally, the mobile device comprises an inertial navigator 61. Optionally, the mobile device comprises a user interface 62, such as a keyboard, touch screen, microphone, and/or speaker. Mobile device 60 may be any of various mobile devices such as a mobile phone, personal digital assistant (PDA), laptop computer, or a tablet computer.

WILOT target terminal 40 comprises a receiver and/or transmitter represented by an antenna 42 for transmitting and/or receiving WILOT signals to and/or from an infrastructure of at least one WILOT tracker system, a controller 44, and associated computer instruction sets, application specific integrated circuits (ASICS), and/or systems on a chip, that the processor uses for processing the signals. The at least one WILOT tracker system may comprise any of various WILOT tracker systems implementing any of various wireless location technologies, and may for example, comprise a GPS tracker system, a mobile phone network tracker system, and any combination of such systems. In the present discussion it is assumed that WILOT terminal 40 is configured to support a mobile telephone tracker system and a GPS tracker system, and in FIG. 1A WILOT terminal 40 is schematically shown communicating with satellites 102 of the GPS system infrastructure and with base stations 104 of the mobile phone tracker infrastructure.

Optionally, controller 44 processes WILOT signals transmitted to and/or received from the GPS infrastructure and/or the mobile phone infrastructure to determine spatial locations and associated ROUs of WILOT target terminal 40, and thereby for device 60 and a bearer of the device. In a default mode Discriminating Tracker 20 operates to provide WILOT locations for device 60 based on the mobile phone tracker system. Processor 22 receives data defining the locations provided by WILOT terminal 40 and processes the data to determine whether locations it receives are outlier locations, and if and how locations classified as outlier locations may be used to determine locations for the target. Operation of processor 22 in determining which WILOT locations are to be classified as outliers and circumstances under which Discriminating Tracker 20 operates to provide GPS locations are described below in a discussion of a flow diagram of an algorithm that the processor optionally uses to make the determination.

In an embodiment of the invention, memory device 30 has a database 32 stored therein comprising data defining features of a target for which Discriminating Tracker 20 provides locations and that the Discriminating Tracker may use to discriminate outlier locations provided by a WILOT tracker for the target. Optionally the target features are used to determine expected target locations and their associated variances that are used to discriminate outliers. The features may, by way of example, comprise features and conditions of a person and/or a vehicle that bears the Discriminating Tracker, and records of trips made by the person and/or the vehicle and its driver. Optionally, memory device 30 has stored therein a database 31 comprising data defining features of an environment in which the target moves that the Discriminating Tracker may use in discriminating outlier locations provided for the target. Environment features may for example comprise road conditions that limit a speed with which a target vehicle bearing the Discriminating tracker can travel. Examples of how target and environment features may be used in discriminating outliers are discussed below.

Whereas in the above description all components of Discriminating Tracker 20 are described as being housed in a same mobile device (device 60 in FIG. 1A), practice of the invention is not limited to "centralized" Discriminating Tracker in which all, or substantially all of the Discriminating Tracker components are in a single device or location. A Discriminating Tracker may have a distributed configuration with components at different locations. For example, memory device 30 may reside in at least one first stationary server, and Discriminating Tracker processor 22 may reside in a second server at a location different from a location of the at least one first server. Environment and target data may be stored, as shown in FIG. 1A, at least partially in cloud based databases that reside in the internet 100.

FIG. 1B shows a flow diagram of an algorithm 200 that Discriminating Tracker processor 22 optionally uses to discriminate outlier locations provided by WILOT terminal 40 for a target of the tracker.

In a block 202, processor 22 (FIG. 1A) receives locations $S(t_0), S(t_1), \ldots S(t_{n-1})$, and associated ROUs $ROU(t_0), ROU(t_1) \ldots ROU(t_{n-1})$ for the target from WILOT terminal 40 for each of a plurality of consecutive times $t_0, t_1, t_2, t_3, \ldots t_{n-1}$. The letter "S" used above in designations of locations is bold faced and italicized to indicate that the locations are vector quantities. In a block 204 an additional n-th location $S(t_n)$ and associated $ROU(t_n)$ for the target is received for a time $t_n$. The reception of $S(t_n)$ and $ROU(t_n)$ in a block separate from block 202 is made for convenience of presentation. In blocks 202 and 204 Discriminating Tracker is optionally operating in a default mode in which WILOT terminal 40 provides locations $S(\bullet)$ and $ROU(\bullet)$s responsive to signals received from the mobile phone network tracker.

In a block 206 processor 22 determines an average velocity $\overline{v}(t_n)$ and an average acceleration $\overline{a}(t_n)$ of the target for time $t_n$ and variances $\sigma \overline{v}(t_n)$ and $\sigma \overline{a}(t_n)$ of the averages respectively responsive to the locations $S(\bullet)$ and $ROU(\bullet)$s received from the WILOT terminal. Optionally, the averages and variances are moving averages and variances determined from a last "N" locations $S(\bullet)$ and $ROU(\bullet)$s including $S(t_{n-1})$ and $ROU(t_{n-1})$. In a block 208, processor 22 optionally determines an estimate $ES(t_n)$ for location $S(t_n)$ of the target for time $t_n$ and an associated ROU estimate, $EROU(t_n)$ for $ES(t_n)$.

In a block 210, the processor compares the received $S(t_n)$ and $ROU(t_n)$ to the estimates $ES(t_n)$ and $EROU(t_n)$. In a decision block 212 the processor decides if the comparison performed in block 210 indicates that the received and estimated locations and ROUs are statistically consistent. In an embodiment of the invention $S(t_n)$ and $ES(t_n)$ are considered to be statistically consistent if a distance $|S(t_n)-ES(t_n)|$ is less than or equal to about an average of characteristic lengths defining sizes of $ROU(t_n)$ and $EROU(t_n)$. If $S(t_n)$ and $ES(t_n)$ are determined to be consistent, in a block 214 the processor accepts the received location $S(t_n)$ and its associated $ROU(t_n)$ as valid indications of the location of the target, increases n to n+1, and returns to block 204 to receive a next location and ROU from WILOT terminal 40 and proceed again to decision block 214.

If on the other hand in decision block 212 processor 22 determines that the received and estimated locations are not statistically consistent, processor skips block 214 and optionally proceeds to a block 216. In block 216 processor 22 vets received $S(t_n)$ and $ROU(t_n)$ to determine if they are compatible with tracker data describing features of the target for which $S(t_n)$ and $ROU(t_n)$ are determined. For example, while $S(t_n)$ and $ROU(t_n)$ for the target may not be statistically consistent with estimates $ES(t_n)$ and $EROU(t_n)$ because $S(t_n)$ is displaced too far from $S(t_{n-1})$, physical features and condition of the target may in fact enable the target to move from $S(t_{n-1})$ to $S(t_n)$ in a time $(t_n-t_{n-1})$. If $S(t_n)$ and $ROU(t_n)$ are incompatible with tracker data, processor 22 proceeds to a block 230 discards $S(t_n)$ and $ROU(t_n)$ as invalid, increases n to n+1, and returns to block 204.

If received $S(t_n)$ and $ROU(t_n)$ are determined in block 216 to be compatible with target data, processor 22 proceeds to a decision block 218 to determine if received $S(t_n)$ and $ROU(t_n)$ are compatible with environment data. For example, even if the target is physically capable of moving from $S(t_{n-1})$ to $S(t_n)$ in a time $(t_n-t_{n-1})$ in flat terrain, it might not be able to do so in hilly terrain. If $S(t_n)$ and $ROU(t_n)$ are incompatible with environment data, processor 22 proceeds to block 230 discards $S(t_n)$ and $ROU(t_n)$ as invalid, increases n to n+1, and returns to block 204. On the other hand if $S(t_n)$ and $ROU(t_n)$ are compatible with environment data, the processor proceeds to a block 220.

In block 220 Discriminating Tracker 20 controls WILOT terminal 40 to provide a location $S(t_{n+1})$ and associated ROU $(t_{n+1})$ responsive to signals from the GPS tracker system supported by WILOT terminal 40. Whereas providing GPS locations consumes a relatively large amount of energy in comparison to an amount of energy consumed in providing WILOT locations using the mobile phone network tracker, the GPS locations and ROUs are generally substantially more accurate and reliable than those provided by the mobile phone tracker. The GPS locations are therefore advantageous for use in vetting mobile phone tracker WILOT locations to determine if they are outliers.

In a block 222 processor 22 compares $S(t_{n+1})$ and $ROU(t_{n+1})$ to GPS $S(t_n)$ and $ROU(t_n)$. In a decision block 224, the processor decides whether the comparison performed in block 224 indicates whether $S(t_n)$ and $ROU(t_n)$ are consistent or inconsistent with the GPS location $S(t_{n+1})$ and $ROU(t_{n+1})$. If they are consistent, processor 22 proceeds to a block 226 accepts $S(t_n)$ and $ROU(t_n)$ as valid, increase n to n+1 and returns to block 204. If however, $S(t_n)$ and $ROU(t_n)$ are determined to be inconsistent with the GPS location and ROU, the processor proceeds to block 228 where it discards $S(t_n)$ and $ROU(t_n)$ as invalid, increases n to n+1 and returns to block 204.

Figure 2:
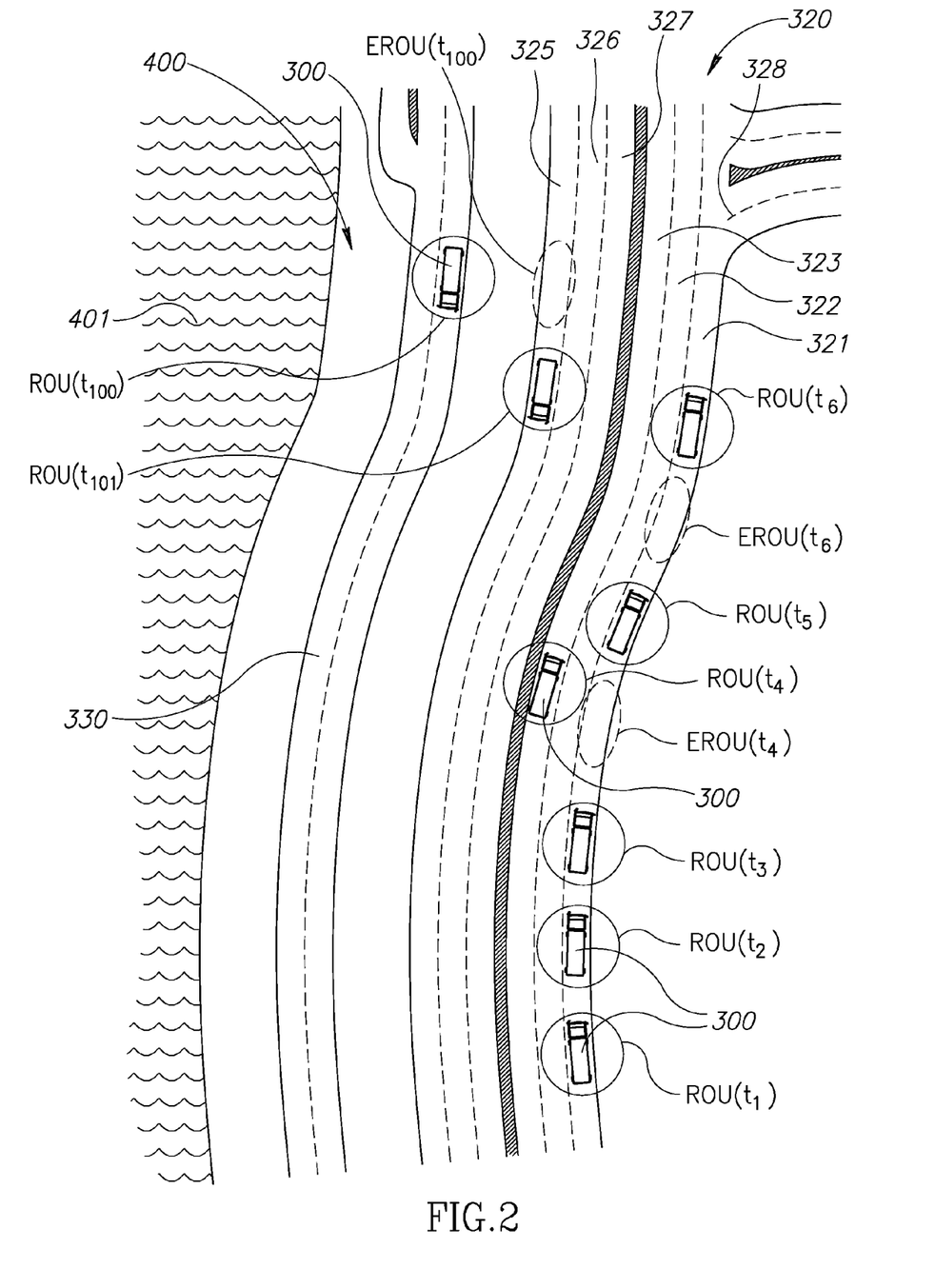
FIG. 2 schematically shows a Discriminating Tracker tracking a tractor-trailer moving along a coastal highway responsive to locations provided by a WILOT tracker and identifying outlier locations provided by the WILOT tracker, in accordance with an embodiment of the invention.

FIG. 2 schematically illustrates performance of an algorithm similar to algorithm 200 in a scenario in which a Discriminating Tracker in accordance with an embodiment of the invention operates to track a tractor-trailer 300 and detect and process outlier locations. The tractor-trailer is assumed to belong to a delivery company having a fleet of trucks that it tracks using the Discriminating Tracker to provide cargo delivery services to its customers. The Discriminating Tracker is similar to a Discriminating Tracker, such as Discriminating Tracker 20 or variations thereof, described above. Optionally, Discriminating Tracker 20 is configured as a distributed system having components of the Discriminating Tracker comprised in a company dispatch center (not shown), tractor-trailer 300, and the internet.

In an embodiment of the invention, tractor-trailer 300 is provided with a mobile device comprising a WILOT target terminal 40, an inertial navigator 61, and an internet interface 50 (FIG. 1A) and/or a mobile telephone terminal, optionally WILOT terminal 40, for communicating with the dispatch center. Optionally, the company dispatch center maintains a Discriminating Tracker processor, such as Discriminating Tracker processor 22 shown in FIG. 1A. Discriminating Tracker processor 22 may comprise an application stored on a company server, and/or an application, that is, a "cloud based" application, which is accessed by the dispatch center and/or by the tractor-trailer from the internet.

Optionally, the dispatch center maintains a target database 32 having a vehicle file for each of the company vehicles and a personal file for each of the company drivers, in a server at the dispatch center. A company vehicle file may comprise data specifying the vehicle, its history, and service record. A driver personal file may comprise data characterizing physical and/or psychological features of a driver. A personal file may, for example, comprise personal information provided by the driver, and/or statistical information generated by the Discriminating Tracker from past driving assignments, and/or information acquired from driver performance records. The dispatch center may also maintain on its server an environment database 31 having data characterizing natural and manmade features of the geographical region for which it provides delivery services. In an embodiment of the invention data in the company databases may be at least partially cloud based, that is, on the internet.

By way of example, tractor-trailer 300 is assumed to be moving along a six lane divided highway 320 having three northbound lanes 321, 322 and 323, and three southbound lanes 325 326 and 327, on its way to making a delivery. Highway 320 is located in a coastal region 400 bounded by the sea 401. A scenic route 330 is located in coastal region 400 between highway 320 and the sea. The tractor-trailer is moving in northbound lane 321, which is a trucking lane.

As tractor-trailer 300 moves along lane 321, WILOT terminal 40 generates location readings and associated ROUs for tractor-trailer 300 at regular time intervals. In FIG. 2 an ROU provided for a location of tractor-trailer 300 at a time "$t_n$" is schematically represented by a circle labeled $ROU(t_n)$ surrounding an image of tractor-trailer 300. A location $S(t_n)$ associated with a given $ROU(t_n)$ is assumed to be at the center of the circle. For convenience of presentation, locations $S(t_n)$ are not explicitly shown in FIG. 2 but are, as noted above assumed, to be at centroids of icons representing the ROU $(t_n)$s with which they are respectively associated. FIG. 2 schematically shows ROUs acquired for consecutive times arbitrarily designated $t_1, t_2, t_3, \ldots$.

In accordance with an embodiment of the invention, Discriminating Tracker processor 22 receives data defining the locations and ROUs generated by WILOT terminal 40 and processes the data to provide a moving average and variance of a velocity "$\bar{v}$" at which the tractor-trailer is moving, and optionally a moving average and variance "$\bar{a}$" and $\sigma a$ of its acceleration. Bold italicized text for v and a is used to indicate that v and a are vector variables. For convenience of presentation components of vectors v and a are measured parallel, transverse and perpendicular to a lane of highway 320. A component parallel to a lane is referred to as a longitudinal component. A component perpendicular to a lane is a vertical component of a vector perpendicular to the surface of the lane. A moving average is an average determined from a last "N" locations provided by the WILOT tracker. Optionally, the processor is configured with an instruction set to determine for a time $t_n$ the moving averages and variances $\bar{v}(t_n)$ and $\sigma \bar{v}(t_n)$, $\bar{a}(t_n)$ and $\sigma \bar{a}(t_n)$, by fitting a function of the form $S(t_n)=S(t_{n-1})+v\Delta t+(\frac{1}{2})a\Delta t^2$ to a last "N" locations $S(t_{n-N+1})$, $S(t_{n-N+2}) \ldots S(t_n)$ provided by the WILOT terminal for the tractor-trailer.

In an embodiment of the invention, Discriminating Tracker 20 uses $\bar{v}(t_n)$ and $\sigma \bar{v}(t_n)$, $\bar{a}(t_n)$ and $\sigma \bar{a}(t_n)$, to determine an expected value $ES(t_{n+1})$ and expected region of uncertainty EROU($t_{n+1}$) for a next location S($t_{n+1}$) provided by WILOT terminal 40 for the tractor-trailer. FIG. 2 schematically shows an EROU($t_4$) determined responsive to $\bar{v}(t_3)$, $\sigma\bar{v}(t_3)$, $\bar{a}(t_3)$, and $\sigma\bar{a}(t_3)$ as an ellipse. An expected location ES($t_4$) associated with EROU($t_4$) is assumed to be located at a centroid of the ellipse, which for the ellipse is coincident with the center of the ellipse. EROU($t_4$) is shown as elliptical because, in general, for travel along a same lane of a highway, it is expected that both $\bar{a}(t_n)$ and $\sigma\bar{a}(t_n)$ are in general very small compared to $\bar{v}(t_n)$ and $\sigma\bar{v}(t_n)$, and that an expected location of tractor-trailer 300 along a lane in highway 320 will therefore in general be characterized by a greater longitudinal variance $\sigma_L$ along the highway than a variance $\sigma_T$ transverse to the highway.

Whereas expected ES($t_4$) and EROU($t_4$) are shown in lane 321, WILOT terminal 40 provides a location S($t_4$) and ROU ($t_4$) that indicates that tractor-trailer 300 is traveling in lane 323. Processor 22 compares S($t_4$) and ROU($t_4$) with ES($t_4$) and EROU($t_4$) to determine whether or not to classify ROU ($t_4$) as an outlier. In an embodiment of the invention, processor 22 determines that ROU($t_4$) S($t_4$) is an outlier if a distance between S($t_4$) and ES($t_4$) is greater than a predetermined multiple of a variance of ES($t_4$). Optionally, S($t_4$) is classified as an outlier if a component of a difference [S($t_4$)–ES($t_4$)] transverse to lane 321 is greater than $\sigma_T$ or if a component of [S($t_4$)–ES($t_4$)] along lane 321 is greater than $\sigma_L$. In FIG. 2, whereas the longitudinal component of [S($t_4$)–ES($t_4$)] along lane 321 is not greater than $\sigma_L$, its transverse component is greater than $\sigma_T$ and therefore S($t_4$) is determined to be an outlier.

In response to determining that S($t_4$) is an outlier, in an embodiment of the invention Discriminating Tracker 20 stores data defining S($t_4$) optionally in memory device 30 and does not use S($t_4$) to provide updated values for the average velocity and acceleration and their associated variances, that is for determining to $\bar{v}(T_4)$, $\sigma\bar{v}(t_4)$, $\bar{a}(t_4)$, and $\sigma\bar{a}(t_4)$. Optionally, Discriminating Tracker 20 operates to determine if S($t_4$), which is classified as an outlier responsive to $\bar{v}(t_3)$, $\sigma\bar{v}(t_3)$, $\bar{a}(t_3)$, and $\sigma\bar{a}(t_3)$ is corroborated by a next location S($t_5$) for tractor-trailer 300 provided by WILOT terminal 40.

If S($t_4$) is corroborated by the next location Discriminating Tracker 20 uses S($t_4$) to determine values for velocity and acceleration and their respective variances for use in calculating expected values for ES($t_n$) and ROU($t_n$) for n greater than 5. If on the other hand S($t_4$) is not corroborated by S($t_5$) Discriminating Tracker 20 optionally discards S($t_4$) and does not use it, nor optionally, its associated ROU($t_4$) to determine future expected values for locations of tractor-trailer 300. By way of example, in FIG. 2, a next location S($t_5$) and ROU($t_5$) provided by WILOT terminal 40 appears to be consistent with $\bar{v}(t_3)$, $\sigma\bar{v}(t_3)$, $\bar{a}(t_3)$, and $\sigma\bar{a}(t_3)$, as a result of which, Discriminating Tracker confirms and discards S($t_4$).

By way of another example of an outlier location discriminated by Discriminating Tracker 20, S($t_6$) and ROU($t_6$) are located substantially farther along lane 321 than ES($t_6$) and EROU($t_6$). Whereas FIG. 2 schematically shows that a difference [S($t_6$)–ES($t_6$)] transverse to lane 321 is equal to about zero and is less than $\sigma_T$, a component of [S($t_6$)–ES($t_6$)] along lane 321 is shown greater than $\sigma_L$. S($t_6$) is therefore classified as an outlier.

In an embodiment of the invention, Discriminating Tracker 20 corroborates a location provided by a first tracker system supported by WILOT terminal 40 with a location provided by a different tracker system supported by the WILOT terminal. For example, in a default operating mode Discriminating Tracker 20 may normally acquire locations for tractor-trailer 300 using the mobile phone network tracker system supported by WILOT terminal 40. To acquire a location to corroborate a location provided by the mobile phone network tracker system, Discriminating Tracker 20 optionally operates to acquire a location for tractor-trailer 300 using the GPS tracker system. For example, Discriminating Tracker 20 optionally acquires location S($t_4$) using the default mobile phone tracking network and location S($t_5$) using the GPS tracker system.

Discriminating Tracker 20 optionally, operates to acquire a GPS location if an amount of energy consumed by using the GPS tracker system is less than a predetermined threshold. For example, energy available to mobile device 60 may be limited and energy consumed by the GPS system may be consumed at an expense of energy available for supporting telecommunication services provided by mobile device 60. Discriminating Tracker 20 may therefore be configured to use the GPS tracker only if energy available for telecommunications is greater than a predetermined threshold minimum. A predetermined threshold may require that the GPS tracker system is used only if after its use mobile communication device 60 has enough energy to support transmission of telecommunication signals for at least sixty minutes.

Discriminating Tracker 20 may use information other than location and ROU information to determine and/or corroborate whether to classify a location S($t_n$) as an outlier. For example, inertial tracker 61 provides information relevant to acceleration that may be used to constrain a value for $\bar{a}(t_3)$, and $\sigma\bar{a}(t_3)$ used to determine if S($t_4$) is an outlier. Relative to ROU($t_3$), ROU($t_4$) indicates that between times $t_3$ and $t_4$ tractor-trailer 300 has undergone a transverse acceleration in switching from lane 321 to lane 323. If information received by processor 22 from inertial tracker 61 provides an upper limit to acceleration that tractor-trailer 300 has undergone between times $t_3$ and $t_4$, the upper limit may be used to constrain acceleration and its variance $\bar{a}(t_3)$, and $\sigma\bar{a}(t_3)$. If the constrained acceleration and variance are not consistent with the apparent change of lanes of tractor-trailer 300, the information provided by inertial navigator 61 supports classifying S($t_4$) as an outlier.

Target data available from target database 32 may also be used in determining whether or not S($t_4$) and S($t_6$) are outliers. Both S($t_4$) and S($t_6$) indicate that tractor-trailer 300 has undergone acceleration. The target data in memory device 30 may indicate that for the weight of cargo carried by the tractor-trailer, a maximum acceleration that the tractor-trailer can provide is less than that needed to move the tractor-trailer to locations indicated by ROU($t_4$) and ROU($t_6$) in time intervals ($t_4$–$t_3$) and ($t_6$–$t_5$) that are respectively available for making the moves.

At a time following $t_6$ tractor-trailer 300 is assumed to leave highway 320 at a turnoff 328 to deliver its cargo to its destination and return to a depot of the cargo company. The delivery is assumed to be a frequently repeated delivery to a regular customer. A record of the deliveries has established a pattern by which off loading the cargo at its destination is performed in an hour following which the tractor-trailer returns via southbound lanes 325 and 326 in highway 320. At a time $t_n$, arbitrarily referred to as $t_{100}$, WILOT terminal 40 provides data defining ROU($t_{100}$) and its associated location S($t_{100}$) indicating that tractor-trailer 300 is returning to the company depot via scenic route 330. While it is not impossible, nor against company rules for a driver to return tractor-trailer 300 via scenic route 330, returning via the scenic route does not follow an established habitual pattern for the delivery. Target data in target data base 32 indicates that historically, scenic route 330 is used to return tractor trailer 300 only once in ten deliveries. An expected, "habitual" $EROU(t_{100})$ is schematically shown on lane 325 of highway 320.

In an embodiment of the invention, processor 22 is configured to classify a WILOT location as an outlier for a reason that it does not accord with an established habit, if under the circumstance for which the habit is established, the WILOT location has a percent probability of occurring that is less than or equal to about 10%. As a result, processor 22 classifies $ROU(t_{100})$ and its associated location $S(t_{100})$ as outliers, and checks if a next location, $S(t_{101})$, corroborates $S(t_{100})$. As indicated in the figure $S(t_{101})$ is located in southbound lane 325 as expected from past behavior and $S(t_{100})$ is considered spurious and discarded.

In an embodiment of the invention a WILOT location is considered an outlier because it does not accord with an established habit, if under the circumstance for which the habit is established, the WILOT location has a percent probability of occurring that is less than or equal to about 10%. For example, if for the delivery discussed above, scenic route 330 was historically used to return tractor trailer 300 only once in ten deliveries, then $S(t_{100})$ and $S(t_{100})$ are classified as outliers.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method of determining a location of a mobile target, the method comprising:
   receiving data provided by a wireless location technology (WILOT) defining a plurality of locations responsive to locations of the target at different times;
   determining whether a given location of the plurality of locations is an outlier location;
   if the given location is determined to be an outlier, receiving data defining an additional location for the target and determining if the outlier location is corroborated by the additional location; and
   if corroborated, using the outlier location as a location for the target.

2. A method according to claim 1, wherein if the outlier is not corroborated, comprising determining whether the outlier is compatible with features of the target.

3. A method according to claim 2, wherein if the outlier is compatible with features of the target comprising using the outlier to provide a location for the target.

4. A method according to claim 2 and comprising determining if the outlier is compatible with features of the environment, and only if compatible with features of the environment, using the outlier to provide a location for the target.

5. A method according to claim 1 wherein determining whether the given location is an outlier comprises calculating a moving average for a velocity characteristic of the target responsive to the plurality of locations and using the moving average of the velocity to determine if the given location is an outlier.

6. A method according to claim 5 and determining a variance for the moving average velocity and using the variance to determine if the given location is an outlier.

7. A method according to claim 6 and using the moving average velocity and its variance to determine an expected location for the given location.

8. A method according to claim 7 and using the moving average velocity and its variance to determine an expected region of uncertainty (ROU) for the expected location.

9. A method according to claim 8 and determining that the given location is an outlier if it is not consistent with the expected location and expected ROU.

10. A method according to claim 1 wherein determining whether the given location is an outlier comprises calculating a moving average for an acceleration of the target responsive to the plurality of locations, and using the moving average of the acceleration to determine if the given location is an outlier.

11. A method according to claim 10 and determining a variance for the moving average acceleration and using the variance to determine if the given location is an outlier.

12. A method according to claim 11 and determining an expected location for the given location responsive to the moving average acceleration and its variance.

13. A method according to claim 12 and using the moving average velocity and its variance to determine an expected region of uncertainty (ROU) for the expected location determined responsive to the moving average acceleration and its variance.

14. A method according to claim 13 and determining that the given location is an outlier if it is not consistent with the expected location and expected ROU determined responsive to the moving average acceleration and its variance.

15. Apparatus for determining a location of a mobile target, the apparatus comprising:
   a wireless location technology (WILOT) tracker that provides a plurality of locations of the target; and
   a processor that:
   determines whether a given location of the plurality of locations is an outlier location;
   receives data defining an additional location for the target if the given location is determined to be an outlier;
   determines if the outlier location is corroborated by the additional location; and
   if corroborated, uses the outlier location as a location for the target.

16. Apparatus according to claim 15 wherein the processor:
   generates moving averages for a velocity that characterizes motion of the target responsive to the locations;
   uses the moving averages to determine whether or not a given location provided by the WILOT tracker is an outlier; and
   uses the given location as a location for the target if it is determined not to be an outlier.

17. Apparatus according to claim 16 wherein the processor determines a variance for the moving average velocity responsive to the locations.

18. Apparatus according to claim 17 wherein the processor uses the moving average velocity and its variance to determine an expected region of uncertainty (ROU) for the location.

19. Apparatus according to claim 18 wherein the processor determines that the gin location is an outlier if it is not consistent with the location and expected ROU.

20. Apparatus according to claim 16 wherein the processor generates moving averages of an acceleration that characterizes motion of the target responsive to the locations provided by the WILOT tracker and uses the moving average acceleration to determine if the given location is an outlier.

* * * * *